Figure 1:
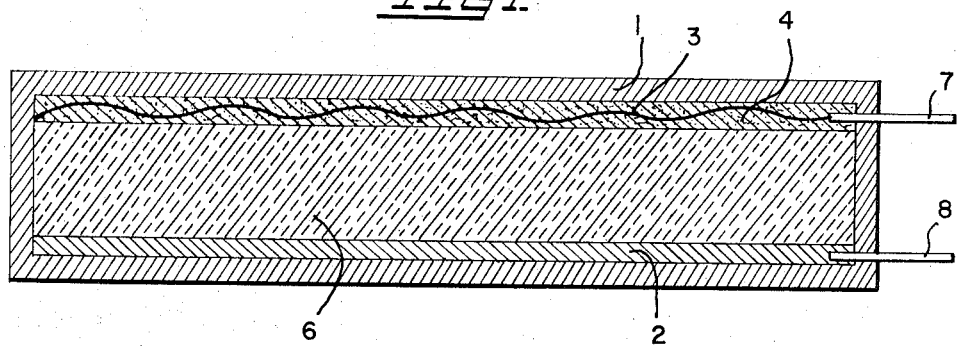

United States Patent [19]
Benderly et al.

[11] 3,819,415
[45] June 25, 1974

[54] THERMAL REACTION BATTERY
[76] Inventors: Asaf A. Benderly, 9915 Logan Dr., Potomac, Md. 20854; Donald R. Hartter, 1701 E. West Hwy., Silver Spring, Md. 20910
[22] Filed: Apr. 9, 1970
[21] Appl. No.: 24,430

Related U.S. Application Data
[63] Continuation of Ser. No. 541,861, April 11, 1966, abandoned.

[52] U.S. Cl. ............ 136/83 T, 136/100 R, 136/153
[51] Int. Cl. .......................................... H01m 21/14
[58] Field of Search ............. 136/83, 83.1, 100, 90, 136/112, 86, 153, 154, 6

[56] References Cited
UNITED STATES PATENTS
1,924,314   8/1933   Heise .................................... 136/90
3,055,960   9/1962   Yalom et al. ...................... 136/83 X
3,117,032   1/1964   Panzer ............................... 136/90 X
3,194,686   7/1965   Jerome ................................. 136/90
3,311,503   3/1967   Zellhoefer ............................ 136/83

Primary Examiner—Anthony Skapars
Attorney, Agent, or Firm—Edward J. Kelly; Herbert Berl; Saul Elbaum

[57] ABSTRACT

An improved thermal reaction battery consisting of a cathode, an anode and a precursor in contact with the electrodes, wherein the precursor is a non-conductive solid at ambient temperatures chemically reactive on thermal activation to form a permanently liquid electrolyte.

6 Claims, 2 Drawing Figures

PATENTED JUN 25 1974

3,819,415

INVENTORS
ASAF A. BENDERLY
DONALD R. HARTTER

BY Harry M. Saragovitz,
Edward J. Kelly, Herbert Berl
& J. D. Edgerton   ATTORNEYS

THERMAL REACTION BATTERY

This is a continuation of co-pending application Ser. No. 541,861 filed April 11, 1966 now abandoned.

The invention described herein may be used by or for the Government of the United States for governmental purposes without the payment to us of any royalty thereon.

This invention relates to thermally activated batteries, and more particularly to relatively long-lived thermally activated batteries having a novel electrolyte system.

Thermal batteries generally consist of a series of cells such as plates or discs pressed together to provide a compact source of electromotive force. The plates or discs are electrodes fabricated of materials which react to generate a voltage when the battery is activated by heating to a temperature sufficient to cause fuzing of the solid electrolyte contained between the electrodes.

Thermal batteries generally employ an inorganic salt containing mixture as the electrolyte. Under normal storage conditions, the electrolyte is a solid and does not conduct electricity. The battery is activated, for example, by setting off a pyrotechnic heat charge to melt the electrolyte mixture. The inorganic salt becomes conducting in the molten or dissolved condition and provides for reaction of the electrodes to produce the desired electromotive force.

Typical inorganic salts or eutectic salt mixtures for this purpose melt at 350° to 400° C. Mixtures containing a salt in a fusible organic solid melt somewhat lower. However, it is necessary to heat the electrolytes above their fusion or solution temperatures in order to insure that the electrolyte remains molten for the desired length of time. Even so, the typical useful life of such batteries is about 30 seconds.

Thermal batteries have found extensive use in ordnance projectile and missile applications because they provide a compact source of the voltage required to energize vacuum tubes and other electrical equipment in the missile. Such batteries must be rugged in construction yet small in size. Space limitations make it difficult to provide a great deal of thermal insulation for the electrolyte, and the salt, after activation, quickly begins to freeze thereby deactivating the battery. Compensation for such heat loss by excessive pyrotechnic heating may have a detrimental effect on the electronic components present in the missile.

The thermally activated batteries of the present invention avoid these difficulties by using as the electrolyte source a solid non-conductive material, which on demand undergoes a chemical change or reaction and becomes a permanently liquid conductive electrolyte. The resultant electrolyte, being a permanent liquid, does not freeze after it has been activated and the useful life of the battery becomes a function of the time required for consumption of the electrodes. The storage life of the battery is in this case, as in the case of an ordinary thermal battery, very long since the electrolyte is solid and non-conductive prior to activation.

It is, therefore, a principal object of the present invention to provide new and improved thermally activated batteries capable after activation of producing an electromotive force for a relatively long period of time.

It is a further object of this invention to provide novel electrolyte precursor systems for use in thermal reaction batteries which are solid and non-conducting until activated and which become permanently liquid and conducting after activation.

Figure 2:
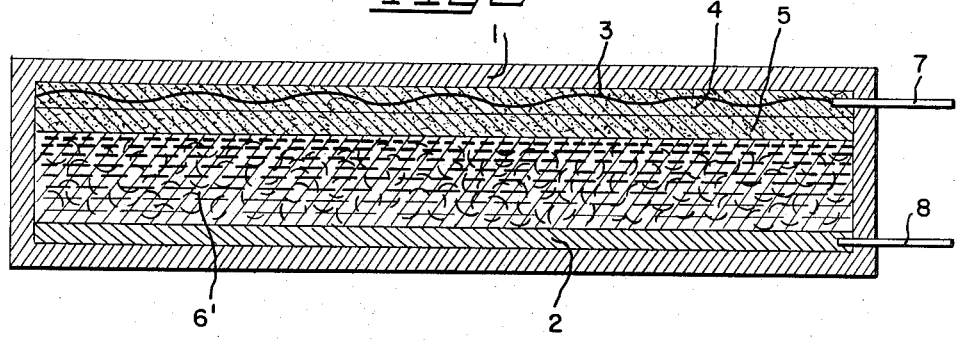

These and other objects and advantages of the present invention will become apparent on consideration of the thermal reaction batteries more fully described in the following discussion and accompanying drawing wherein:

FIG. 1 is a sectional elevation of a thermal reaction battery cell prior to activation; and FIG. 2 is a sectional elevation of a similar thermal reaction battery cell after it has been activated.

The present invention is a thermal reaction battery consisting of a cathode, an anode and an electrolyte precursor, the electrolyte precursor comprising a non-conductive solid at ambient temperatures chemically reactive on thermal activation to form a permanently liquid ionic conductor.

The novel feature of the thermal reaction batteries of the present invention is that they contain electrolyte precursors which undergo chemical reaction on heating to form ionically conductive permanent liquids. This is to be contrasted with prior art electrolytes which revert to solids more or less rapidly on cooling and wherein the change in phase from solid to liquid is due primarily to a physical rather than a chemical transformation.

Chemical reactions useful for producing permanent liquids from non-conductive solids can be classified as bimolecular or unimolecular reactions. An illustrative bimolecular reaction utilizes as the electrolyte precursor a mixture of phenyliodoso diacetate (m.p. 158° C.) and hydrobenzoin (m.p. 139° C.). The mixture is a non-conductive solid within the broad storage temperature range of 54° to +71° C. On heating to 200° C., the mixture melts and its constituents react to form phenyl iodide, acetic acid and benzaldehyde, all liquids at or below room temperature. The resultant liquid mixture remains liquid and is an ionic conductor. Similar results are obtained when lead tetraacetate (m.p. 175° C.) is substituted for phenyliodoso diacetate.

An illustrative series of unimolecular reactions utilizes the thermal cleavage of various α-oximinoketones or α-acetoxyoximino alcohols. For example, benzil monooxime (m.p. 138° C.) upon pyrolysis at 200° C. yields benzoic acid and benzonitrile as indicated:

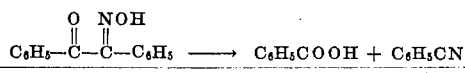

Similarly, α-benzoin oxime acetate upon pyrolysis at 170° C. yields benzaldehyde, benzonitrile and acetic acid as indicated:

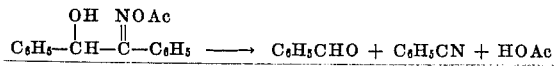

Another unimolecular reaction series involves the thermal decomposition of various alkyl phosphinates in which the phosphinate is thermally cleaved at 150°–200° C. to give two new molecular fragments, an olefin and a phosphinic acid as indicated:

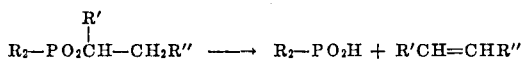

In the illustrative examples given above, the starting material as the result of a chemical reaction is converted to lower melting compounds, at least one of which is an ionic conductor. Reactions of the type illustrated tend to be exothermic and, therefore, have the added advantage of requiring minimum thermal initiation whereupon the chemical reaction becomes selfsustaining. A reduction in weight and required space in the missile results due to the smaller initial heat charge employed.

The chemical structure of the starting materials can be modified in various conventional ways to provide further electrolyte precursor systems exhibiting a wide range in initial and final melting points, boiling points and other physical properties. For example, in the systems illustrated above, hydrobenzoins and longer chain lead or phenyliodoso carboxylic acid salts may be employed. Also, substituted aryliodoso dicarboxylates may be used as starting materials. Other reactions employing solid, non-conducting amines, amides, glycols and other organic or metallorganic starting materials yielding permanently conducting liquid chemical reaction products will suggest themselves to those skilled in the art. The conductivities of the liquid products may be enhanced by the addition of a salt such as aluminum chloride or other chlorides, inorganic fluorides and a wide variety of complex salts depending on the particular reaction system employed.

Our invention is further illustrated by means of the following non-limiting description of a specific embodiment of the invention:

Referring to the drawing, the thermal reaction battery cells shown in FIGS. 1 and 2 comprise an outer container 1, made of a non-conductive and moisture proof material resistant to attack by the contents thereof in the temperature range employed. Within the container is an anode 2 generally made of magnesium, calcium, zinc, cadmium or aluminum, and a cathode 3 of another material such as nickel, iron or platinum, reactive with the anode material to produce an electromotive force. The anode and cathode are provided with terminals 7 and 8, respectively. A depolarizer coating 4 such as an oxide, sulfide or sulfate or other suitable compound preferably of a transition metal is usually applied about the cathode. In FIG. 2, the cathode 3 is shown as having an additional coating 5 of depolarizing substance on the portion thereof facing the anode 2.

An electrolyte or electrolyte precursor layer is disposed between the depolarized cathode and the anode. In FIG. 1, an electrolyte precursor as hereinabove described is shown prior to activation as a non-conductive solid 6. In FIG. 2, after thermal activation, the precursor has undergone chemical reaction to become a permanently liquid ionic conductor 6'. The electrolyte area is shown as filled with an inert fibrous or powder packing in order that the resultant electrolyte remain in good contact with both of electrodes.

It is evident that various changes and modifications may be made in the above-described thermal reaction cell without departing from the spirit and the scope of the present invention. The invention is as described in the appended claims.

We claim:

1. A thermal reaction battery comprising a cathode, an anode and a bimolecularly reactive precursor in contact with said cathode and anode, said precursor comprising an electrically non-conductive solid at an ambient temperature which on thermal activation undergoes an irreversible chemical reaction to form an ionically conductive liquid electrolyte which does not freeze on cooling to said ambient temperatures, wherein the precursor comprises a mixture of phenyliodoso diacetate and a hydrobenzoin.

2. A thermal reaction battery comprising a cathode, an anode and a bimolecularly reactive precursor in contact with said cathode and anode, said precursor comprising an electrically non-conductive solid at an ambient temperature which on thermal activation undergoes an irreversible chemical reaction to form an ionically conductive liquid electrolyte which does not freeze on cooling to said ambient temperatures, wherein the precursor comprises a mixture of lead tetraacetate and a hydrobenzoin.

3. A thermal reaction battery comprising a cathode, an anode and a bimolecularly reactive precursor in contact with said cathode and anode, said precursor comprising an electrically non-conductive solid at an ambient temperature which on thermal activation undergoes an irreversible chemical reaction to form an ionically conductive liquid electrolyte which does not freeze on cooling to said ambient temperatures, wherein the precursor is a benzil monooxine.

4. A thermal reaction battery comprising a cathode, an anode and a unimolecularly reactive precursor in contact with said cathode and anode, said precursor comprising an electrically non-conductive solid at an ambient temperature which on thermal activation undergoes an irreversible chemical reaction to form an ionically conductive liquid electrolyte which does not freeze on cooling to said ambient temperatures, wherein the precursor is a benzil monooxime acetate.

5. A thermal reaction battery comprising a cathode, an anode and a unimolecularly reactive precursor in contact with said cathode and anode, said precursor comprising an electrically non-conductive solid at an ambient temperature which on thermal activation undergoes an irreversible chemical reaction to form an ionically conductive liquid electrolyte which does not freeze on cooling to said ambient temperatures, wherein the precursor is an alkyl phosphinate.

6. A thermal reaction battery comprising a cathode, an anode and a precursor in contact with said cathode and anode, said precursor comprising an electrically nonconductive solid at an ambient temperature which on thermal activation undergoes an irreversible chemical reaction to form an ionically-conductive liquid electrolyte which does not freeze on cooling to said ambient temperature, said precursor being at least one material selected from the group consisting of α-oximinoketones, α-acetoxyoximino alcohol, alkyl phosphinates, and mixtures of a hydro-benzoin and a material selected from the group consisting of a lead or phenyliodoso carboxylic acid salt and substituted aryliodoso dicarboxylates.

* * * * *